(12) United States Patent
Yang

(10) Patent No.: US 9,632,601 B2
(45) Date of Patent: Apr. 25, 2017

(54) TOUCH PEN HAVING BALL MEMBER CONTAINED IN CONDUCTIVE ELASTIC CASING

(71) Applicant: GETAC TECHNOLOGY CORPORATION, Hsinchu County (TW)

(72) Inventor: Chih-Hsien Yang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 29 days.

(21) Appl. No.: 14/603,158

(22) Filed: Jan. 22, 2015

(65) Prior Publication Data

US 2016/0216787 A1 Jul. 28, 2016

(51) Int. Cl.
*G06F 3/0354* (2013.01)

(52) U.S. Cl.
CPC ................. *G06F 3/03545* (2013.01)

(58) Field of Classification Search
CPC .......... G09G 2203/04101; G09G 2203/04108; G06F 3/03545–3/03546; G06F 3/04883; G06F 1/1643; G06F 1/3262
See application file for complete search history.

(56) References Cited

U.S. PATENT DOCUMENTS

| | | | | |
|---|---|---|---|---|
| 4,111,052 A * | 9/1978 | Sniderman | ............... | B43K 7/00 401/194 |
| 5,999,170 A * | 12/1999 | Ooura | ................. | G06F 3/03545 345/173 |
| 2007/0279399 A1* | 12/2007 | Nishimura | .......... | G06F 3/03546 345/179 |
| 2012/0327043 A1* | 12/2012 | Wu | ...................... | G06F 3/03545 345/179 |
| 2013/0100088 A1* | 4/2013 | Mao | .................... | G06F 3/03546 345/179 |
| 2015/0338936 A1* | 11/2015 | Achari | ................ | G06F 3/03545 345/179 |

* cited by examiner

*Primary Examiner* — Sanghyuk Park

(57) ABSTRACT

Disclosed is a touch pen which comprises a pen head, an encasing member, and a shaft. The pen head comprises a conductive elastic casing, a ball member, a fixing device, and an elastic device. The conductive elastic casing comprises a first sealing end and a first receiving portion, wherein the ball member is deposited in the first receiving portion. The fixing device comprises a second sealing end and a second receiving portion. The second receiving portion is connected to the first receiving portion. The elastic device is deposited in the first receiving portion and the second receiving portion and contacts the ball member and presses against the second sealing end. The encasing member encases the conductive elastic casing and is connected with the fixing device. The shaft is connected with the encasing member. The friction can be dispersed by the ball member of the present invention.

13 Claims, 4 Drawing Sheets

TOUCH PEN HAVING BALL MEMBER CONTAINED IN CONDUCTIVE ELASTIC CASING

BACKGROUND OF THE INVENTION

Field of the Invention

The invention relates to a touch pen, and more particularly, to a touch pen with enhanced antifriction effect.

Description of the Prior Art

As touch devices, such as smartphones, tablets, PDAs, automotive satellite navigation devices, etc., develop, the use of touch pens remains the preferred way of precisely implementing functions of writing, drawing, etc. on the touch devices at present. Since capacitive touch devices have substantially replaced the conventional resistive touch devices, the types and structures of touch pens have also changed accordingly. For example, TW Patents No. M438662, M406215, and M393735 all have the common feature of using pen-shaped structures that facilitates assembly to fabricate capacitive touch pens, and conductive materials are used at the pen head so that touch functions may be achieved by utilizing the capacitance changes during touch events.

Conductive materials for pen heads at present are still required to have certain elasticity and flexibility, so as to prevent direct friction with the touch device that may result in scratches or damages on the touch device. The above prior art mostly use a conductive pen head device for implementation, and generate changes in the capacitance during contacts by the conductivity of the pen head device. It may be conceived that, common conductive silicone, conductive rubber, etc. may also be used for implementation. According to the above scheme, the pen head is gradually worn by abrasion under repeated touch friction due to the abrasion of the pen head by the inner structural copper post edges, so that the pen head suffers from damages before the pen head reaches the standard abrasion times under standard test conditions. Considering actual operation situations and actual conditions of usage, the antifriction effect of present touch pens still does not meet the requirements of users. Therefore, an improved structure is required to improve the antifriction properties.

SUMMARY OF THE INVENTION

The main purpose of the present invention is to provide a touch pen which comprises a pen head, an encasing member, and a shaft. The pen head comprises a conductive elastic casing, a ball member, a fixing device, and an elastic device. The conductive elastic casing comprises a first sealing end and a first receiving portion, wherein the ball member is deposited in the first receiving portion. The fixing device comprises a second sealing end and a second receiving portion, wherein the second receiving portion is connected to the first receiving portion and the second sealing end is opposite to the first sealing end. The elastic device is deposited in the first receiving portion and the second receiving portion, and contacts with the ball member and presses against the second sealing end.

The encasing member encases part of the conductive elastic casing and is connected with the fixing device. The shaft is connected with the encasing member, wherein the fixing device and part of the conductive elastic casing are contained in the shaft.

The fixing device may be implemented by a fixing ring and a sealing cap, wherein the sealing cap comprises the second sealing end and is connected with the fixing ring to collectively form the second receiving portion. The encasing member comprises a tip portion and a connecting portion, wherein the tip portion is connected with the shaft and the connecting portion is contained in the shaft, wherein the tip portion and the connecting portion form a through opening, and wherein the first sealing end of the conductive elastic casing penetrates the opening and protrudes outside the tip portion.

Since the conductive elastic casing is constrained and positioned by the encasing member, and the ball member and the elastic device are deposited in the conductive elastic casing, frictional force may be properly dispersed via the movement and rotation of the ball member when using the touch pen. In the meantime, when contacting with the touch device, buffering is further provided to the pen head via the elastic force of the elastic device and the deformation of the conductive elastic casing, and friction is avoided so that the lifespan of the pen head is effectively increased.

DETAILED DESCRIPTION OF THE EMBODIMENTS

Figure 1:
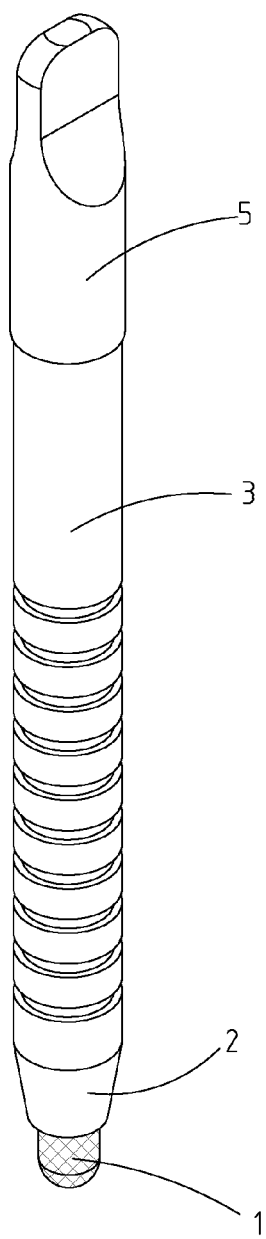
FIG. 1 is a perspective view of a touch pen of the invention.
Figure 2:
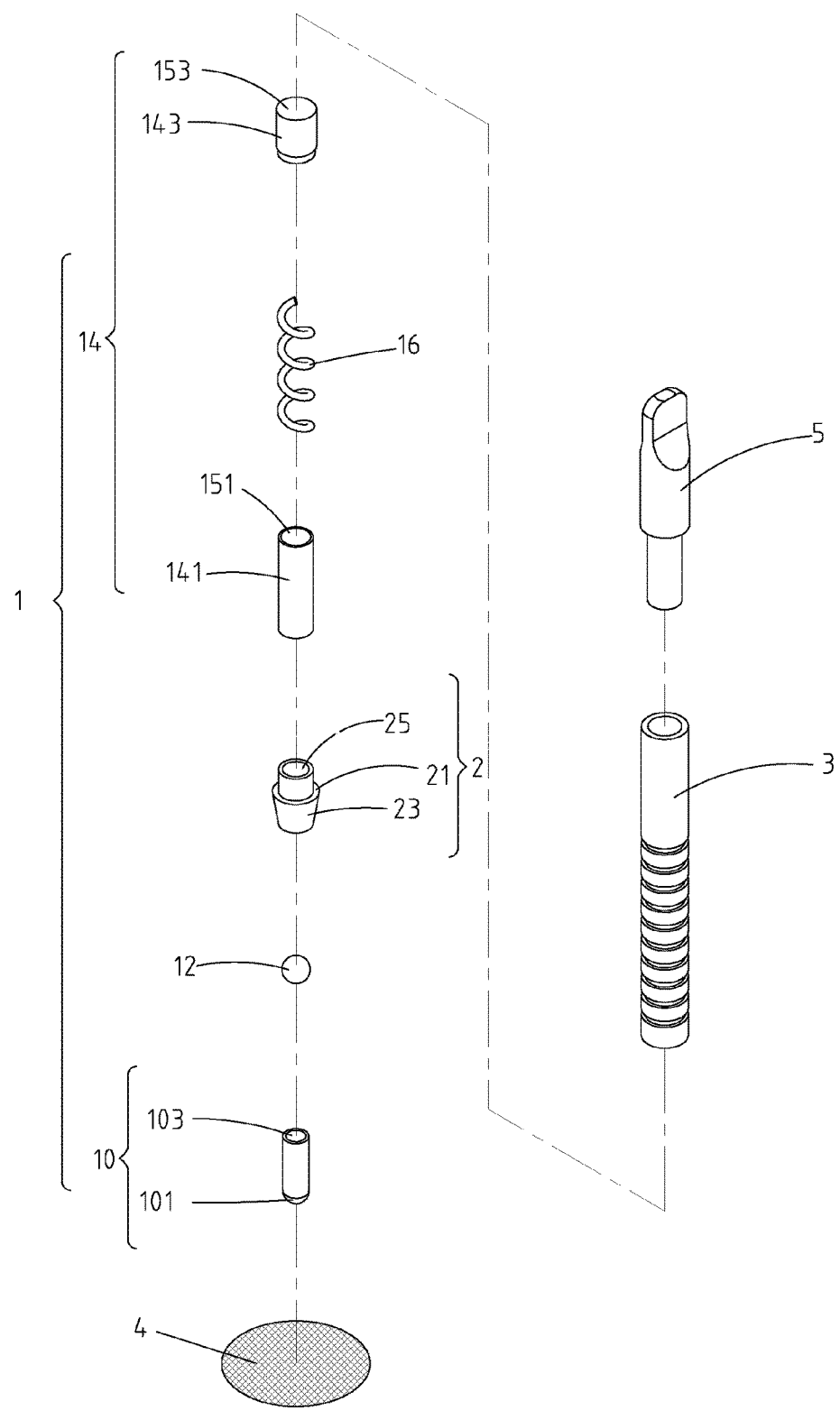
FIG. 2 is an exploded diagram of the touch pen of the invention.
Figure 3:
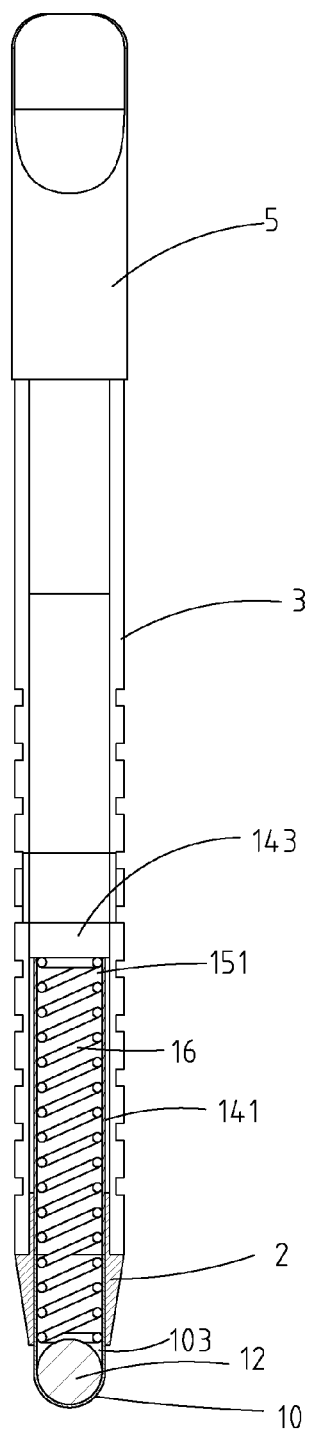
FIG. 3 is a cross-section view of the touch pen of the invention.

FIG. 1 to FIG. 3 show a perspective view, an exploded diagram, and a cross-section view, respectively, of a touch pen of the present invention. As shown in FIG. 1 to FIG. 3, the touch pen of the present invention comprises a pen head 1, an encasing member 2, and a shaft 3. The pen head 1 comprises a conductive elastic casing 10, a ball member 12, a fixing device 14, and an elastic device 16. The conductive elastic casing 10 comprises a first sealing end 101 and a first receiving portion 103, and the material of the conductive elastic casing 10 is selected from a conductive rubber and a conductive plastic.

The ball member 12 is deposited in the first receiving portion 103, and when the diameter of the ball member 12 is smaller than the inner diameter of the first receiving portion 103, such as when the inner diameter of the first receiving portion 103 is 6Ø (i.e., 6 mm) and the diameter of the ball member 12 is 5.6Ø, the ball member 12 may press against the first sealing end 101 or rotate inside the first receiving portion 103. The diameter of the ball member 12 may also be slightly larger than the inner diameter of the first receiving portion 103, such as when the inner diameter of the first receiving portion 103 is 6Ø and the diameter of the ball member 12 is 6.6Ø, so that the ball member 12 may press against the first sealing end 101 and let the conductive elastic casing 10 be slightly deformed.

The fixing device 14 comprises a fixing ring 141 and a sealing cap 143, wherein the sealing cap 143 comprises a second sealing end 153 to seal an end of the fixing device 14. The sealing cap 143 is connected with the fixing ring 141 to collectively form a second receiving portion 151. As shown in FIG. 3, the second receiving portion 151 is connected to the first receiving portion 103 after assembly and the second sealing end 153 is opposite to the first sealing end 101.

Furthermore, the sealing cap 143 may insert into the fixing ring 141. The elastic device 16 is deposited in the first receiving portion 103 and the second receiving portion 143, and contacts with the ball member 12 and presses against the second sealing end 153.

The encasing member 2 encases part of the conductive elastic casing 10, i.e., part of the conductive elastic casing 10 opposite to the first sealing end 101, and is connected with the fixing device 14. When the diameter of the ball member 12 is slightly larger than the first receiving portion 103, the ball member 12 is fastened to a front end of the encasing member 2 and is constrained by the conductive elastic casing 10.

Furthermore, the encasing member 2 encases part of the fixing ring 141 and comprises a tip portion 21 and a connecting portion 23. The tip portion 21 and the connecting portion 23 form a through opening 25, wherein the tip portion 21 has a hollow cone shape and the connecting portion 23 has a hollow ring shape, a hollow tube shape, or a hollow cone shape. The first sealing end 101 of the conductive elastic casing 10 penetrates the opening 25 and protrudes outside the tip portion 21. The shaft 3 is connected with the tip portion 21 of the encasing member 2 and the connecting portion 23 is contained in the shaft 3. Furthermore, the fixing device 14 and part of the conductive elastic casing 10 are also contained in the shaft 3.

Furthermore, the touch pen of the present invention may further comprise a metal fiber fabric 4. The metal fiber fabric 4 covers the conductive elastic casing 10 and is contained in the tip portion 21 of the encasing member 2. The conductivity of the pen head 1 is further increased by being covered with the metal fiber fabric 4, so that the touch sensitivity when the pen head 1 contacts with the touch device may be enhanced. Therefore, the pressing force applied by the user of the touch pen for touching may be accordingly reduced during operation, and the wearing of the pen head 1 by abrasion due to frictional force and abrasion may be further reduced.

Moreover, the touch pen of the present invention may further comprise an end cap 5. The end cap 5 is connected with the shaft 3, wherein the end cap 5 and the encasing member 2 are deposited at opposite ends of the shaft 3, so that users of the touch pen of the present invention may work with the use habits like holding common pens.

Figure 4:
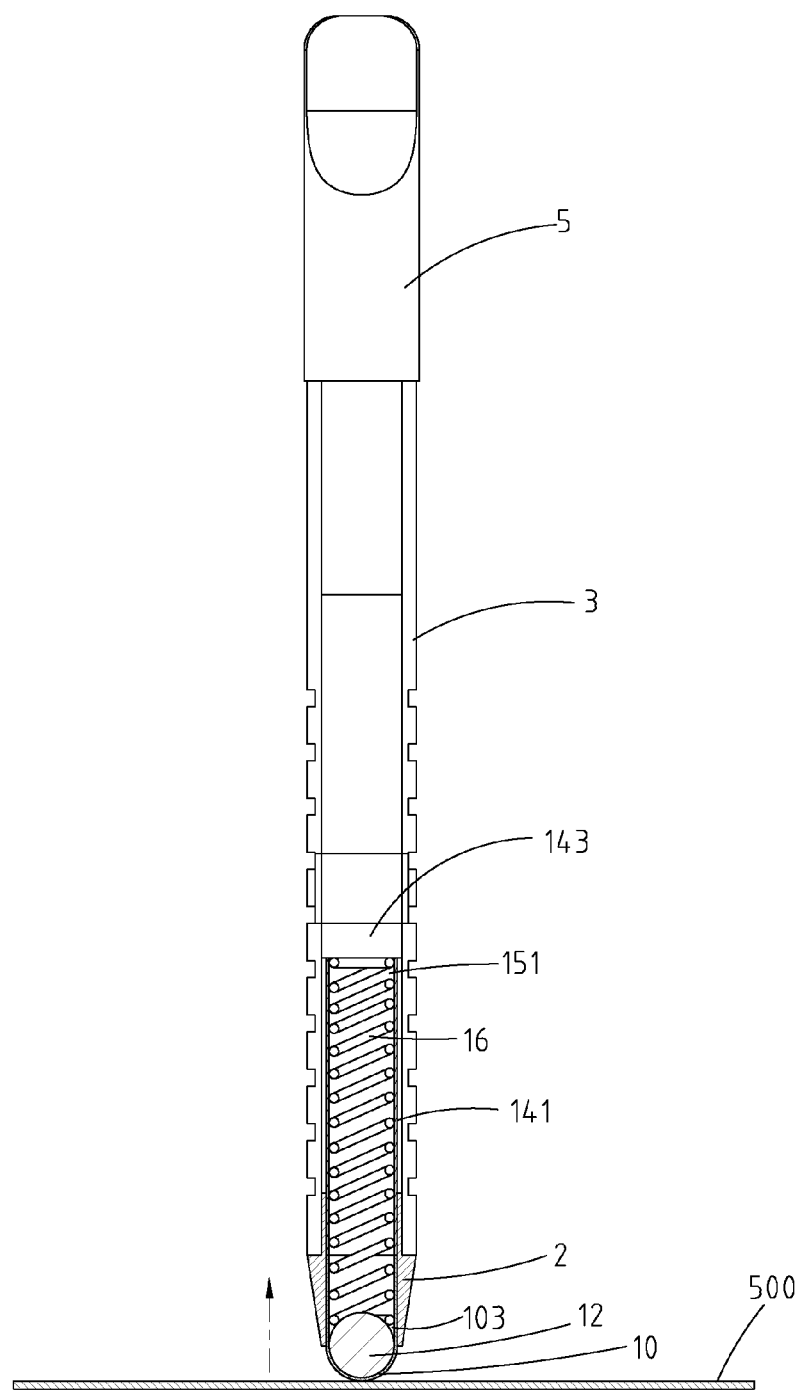
FIG. 4 is a schematic of a contact status of the touch pen of the invention.

FIG. 4 shows a schematic of a contact status of the touch pen of the present invention. As shown in FIG. 4, when the touch pen of the invention is used on a touch device 500, due to the elasticity of the conductive elastic casing 10, a slight deformation occurs at contact and the ball member 12 is pushed inwardly, and the ball member 12 may also undergo deformation resulting from material properties of itself and compress the elastic device 16. Due to the elasticity of the elastic device 16 and the conductive elastic casing 10, the status in FIG. 3 is returned to when there is no contact. By the dispersion of stress generated via the movement, rotation, and deformation of the ball member 12 and the elastic buffering effect provided by the conductive elastic casing 10 and the elastic device 16, frictional force is effectively dispersed and wearing by direct contact abrasion is avoided.

Even when the diameter of the ball member 12 is slightly larger than the first receiving portion 103, friction dispersion effects may also be properly achieved when the ball member 12 rotates under friction, and the overall frictional force is reduced by the slight deformation of the conductive elastic casing 10 and the elastic buffering of the elastic device 16, so that the wearing of the pen head 1 by abrasion is reduced and thus the lifespan of the touch pen is further increased.

The touch pen of the present invention mainly has improvements in the structure of the pen head 1 to enhance the antifriction effect and increase the lifespan of the touch pen. The touch portion of the pen head 1 is formed by combining the conductive elastic casing 10 and the ball member 12, and the elastic device 16 is accordingly deposited to contact with the ball member 12, so that the movement and rotation of the ball member 12 may be utilized to achieve effects of reducing press abrasion on the sides and dispersing frictional forces. Furthermore, when the touch pen contacts with the touch device 500, the conductive elastic casing 10 and the elastic device 16 undergo proper deformation and compression to provide buffering and prevent direct friction, so as to enhance the antifriction effect. In addition, the touch pen of the present invention has a simple overall structure that benefits assembly, which may further facilitate promotion.

What is claimed is:

1. A touch pen, comprising:
    a pen head, comprising:
        a conductive elastic casing, comprising a first sealing end and a first receiving portion;
        a ball member, deposited in the first receiving portion, wherein the ball member is contained entirely within the conductive elastic casing;
        a fixing device, comprising a second sealing end and a second receiving portion, wherein the second receiving portion is connected to the first receiving portion and the second sealing end is opposite to the first sealing end; and
        an elastic device, deposited in the first receiving portion and the second receiving portion, contacting with the ball member and pressing against the second sealing end;
    an encasing member, encasing part of the conductive elastic casing and connected with the fixing device; and
    a shaft, connected with the encasing member;
    wherein the fixing device and part of the conductive elastic casing are contained in the shaft;
    wherein conductive elastic casing is deformable when the pen head is pressed against a surface; and
    wherein the ball member is deformable and rotatable relative to the conductive elastic casing by deformation of the conductive elastic casing.

2. The touch pen as claimed in claim 1, wherein the conductive elastic casing is selected from at least one of a conductive rubber and a conductive plastic.

3. The touch pen as claimed in claim 2, further comprising a metal fiber fabric covering the conductive elastic casing and contained in the encasing member.

4. The touch pen as claimed in claim 1, wherein the ball member presses against the first sealing end.

5. The touch pen as claimed in claim 1, wherein the fixing device comprises a fixing ring and a sealing cap, and wherein the sealing cap comprises the second sealing end and is connected with the fixing ring to collectively form the second receiving portion.

6. The touch pen as claimed in claim 5, wherein the encasing member encases part of the fixing ring.

7. The touch pen as claimed in claim 5, wherein part of the sealing cap inserts into the fixing ring.

8. The touch pen as claimed in claim 1, further comprising an end cap connected with the shaft, wherein the end cap and the encasing member are deposited at opposite ends of the shaft.

9. The touch pen as claimed in claim 1, wherein the encasing member comprises a tip portion and a connecting portion, wherein the tip portion is connected with the shaft and the connecting portion is contained in the shaft, wherein the tip portion and the connecting portion form a through opening, and wherein the first sealing end of the conductive elastic casing penetrates the opening and protrudes outside the tip portion.

10. The touch pen as claimed in claim 9, wherein the tip portion has a hollow cone shape and the connecting portion has a hollow ring shape, a hollow tube shape, or a hollow cone shape.

11. The touch pen as claimed in claim 1, wherein a diameter of the ball member is smaller than the inner diameter of the first receiving portion.

12. The touch pen as claimed in claim 1, wherein a diameter of the ball member is smaller than the inner diameter of the first receiving portion and the ball member is fastened to an end of the encasing member.

13. The touch pen as claimed in claim 1, wherein frictional force during contact of the pen head with the surface is dispersed by movement of the ball member due to compression of the elastic device, deformation of the conductive elastic casing, and deformation and rotation of the ball member.

* * * * *